(12) United States Patent
Xu et al.

(10) Patent No.: US 11,778,018 B2
(45) Date of Patent: Oct. 3, 2023

(54) METHOD FOR TASK OFFLOADING BASED ON POWER CONTROL AND RESOURCE ALLOCATION IN INDUSTRIAL INTERNET OF THINGS

(71) Applicant: SHANGHAI JIAO TONG UNIVERSITY, Shanghai (CN)

(72) Inventors: Jincheng Xu, Shanghai (CN); Peng Zhou, Shanghai (CN); Bo Yang, Shanghai (CN); Cailian Chen, Shanghai (CN); Xinping Guan, Shanghai (CN)

(73) Assignee: Shanghai Jiao Tong University

( * ) Notice: Subject to any disclaimer, the term of this patent is extended or adjusted under 35 U.S.C. 154(b) by 0 days.

(21) Appl. No.: 17/861,123

(22) Filed: Jul. 8, 2022

(65) Prior Publication Data

US 2022/0377137 A1   Nov. 24, 2022

Related U.S. Application Data

(63) Continuation-in-part of application No. PCT/CN2020/138947, filed on Dec. 24, 2020.

(30) Foreign Application Priority Data

Jan. 8, 2020 (CN) .......................... 202010018997.9

(51) Int. Cl.
*H04L 67/1008* (2022.01)
*H04L 41/142* (2022.01)
*H04L 67/12* (2022.01)

(52) U.S. Cl.
CPC ........ *H04L 67/1008* (2013.01); *H04L 41/142* (2013.01); *H04L 67/12* (2013.01)

(58) Field of Classification Search
CPC ... H04L 67/1008; H04L 41/142; H04L 67/12; H04L 43/0852; H04L 43/0876; H04L 67/10; H04L 67/125; H04L 41/145
See application file for complete search history.

(56) References Cited

U.S. PATENT DOCUMENTS

| 8,171,480 | B2 * | 5/2012 | Petruncola | ............ | G06F 9/5083 718/104 |
| 8,527,991 | B2 * | 9/2013 | Hilton | ................... | G06F 9/5033 718/100 |

(Continued)

FOREIGN PATENT DOCUMENTS

| CN | 106572185 A | 4/2017 |
| CN | 109814951 A | 5/2019 |

(Continued)

OTHER PUBLICATIONS

Wu, Zhengkun et al., "Application Offloading Algorithm Based on Multi-edge Node Collaboration", Journal of Nanjing University of Posts and Telecommunications (Natural Science Edition), vol. 39, No. 4, Aug. 31, 2019.

(Continued)

*Primary Examiner* — Javier O Guzman
(74) *Attorney, Agent, or Firm* — Conley Rose, P.C.

(57) ABSTRACT

A method for task offloading based on power control and resource allocation in the Industrial Internet of Things includes establishing a computing model for computation tasks at different offloading locations, constructing communication power control, resource allocation and computation offloading problems as a mixed integer non-linear programming model, solving them using a deep reinforcement learning algorithm to obtain an optimal strategy for offloading of the computation tasks, thus achieving communication power optimization and cross-domain resource allocation.

10 Claims, 3 Drawing Sheets

(56) References Cited

U.S. PATENT DOCUMENTS

| | | | | |
|---|---|---|---|---|
| 8,667,065 | B1* | 3/2014 | Odom | H04L 47/78 709/205 |
| 2010/0023788 | A1* | 1/2010 | Scott | G06F 1/3209 713/320 |
| 2014/0278343 | A1* | 9/2014 | Tran | G06F 40/30 704/9 |
| 2018/0109590 | A1* | 4/2018 | Rao | H04L 67/289 |
| 2018/0131770 | A1 | 5/2018 | Doraiswamy et al. | |
| 2018/0299873 | A1* | 10/2018 | Chauvet | G05B 19/4185 |
| 2019/0138934 | A1* | 5/2019 | Prakash | G06F 9/5072 |
| 2019/0220703 | A1* | 7/2019 | Prakash | G06V 10/95 |
| 2020/0167205 | A1* | 5/2020 | Guim Bernat | H04L 9/3213 |
| 2020/0220905 | A1* | 7/2020 | Park | H04W 36/0022 |
| 2021/0271516 | A1* | 9/2021 | Hs | G06F 9/5088 |

FOREIGN PATENT DOCUMENTS

| | | | | |
|---|---|---|---|---|
| CN | 110351760 | A | 10/2019 | |
| CN | 110418416 | A | 11/2019 | |
| CN | 110505644 | A | 11/2019 | |
| CN | 111245651 | A | 6/2020 | |
| EP | 3826368 | A1 * | 5/2021 | H04W 52/0206 |

OTHER PUBLICATIONS

Kaur, Kuljeet et al., Edge Computing in the Industrial Internet of Things Environment: Software-Defined-Networks-Based Edge-Cloud Interplay, IEEE Communications Magazine, Feb. 28, 2018.
International Search Report dated Mar. 22, 2021, for Application No. PCT/CN2020/138947.

* cited by examiner

METHOD FOR TASK OFFLOADING BASED ON POWER CONTROL AND RESOURCE ALLOCATION IN INDUSTRIAL INTERNET OF THINGS

CROSS-REFERENCE TO RELATED APPLICATIONS

The present application is a continuation-in-part of International Application No. PCT/CN2020/138947 filed Dec. 24, 2022, which claims priority to Chinese Patent Application No. 202010018997.9 filed on Jan. 8, 2020, the disclosures of which are incorporated herein in their entirety by reference.

FIELD OF THE INVENTION

The present invention relates to the field of Industrial Internet of Things, and particularly to a method for task offloading based on power control and resource allocation in the Industrial Internet of Things.

DESCRIPTION OF THE PRIOR ART

The Industrial Internet of Things is an application and expansion of the Internet of Things technology to the industrial sector. Compared with other applications of the Internet of Things, such as intelligent healthcare and intelligent traffic, the industrial sector poses more demanding requirements on the real-time properties and reliability of data. Related studies have shown that most collected industrial data needs to be stored and processed in real time. Therefore, research on efficient task processing strategies capable of meeting the low delay and high reliability requirements is highly necessary.

Development of the Industrial Internet of Things is imposing higher requirements on computational architectures. Cloud computing, as a common computational architecture, possesses abundant computing resources and storage resources. Users, through uploading data to a cloud server for computation, can reduce terminal devices' computational burden. However, in the environment at an industrial site with a large number of devices which generate computation-intensive tasks having demanding requirements on processing delay, uploading massive data to a cloud server would not only lead to network congestion but also produce a great delay. Therefore, edge computing becomes a suitable computational architecture for industrial networking. It can leverage the computing and storage capacity of network edge devices to extend the capabilities of cloud computing to network edges, providing abundant computing resources while effectively reducing network delay and alleviating the stress of network load. Edge computing, thanks to its low delay and high bandwidth advantages, is applicable to many computation-intensive and latency-critical scenarios.

The Industrial Internet of Things, after being combined with edge computing, has brought some new modes and challenges to task processing in networks. Firstly, in the complicated environment at an industrial site, the heterogeneity of underlying devices leads to different computing and communicating capabilities of devices, and computation tasks generated by them have different data volume, computational load and delay requirements. The devices need an optimal computing model that can satisfy the tasks' requirements. Secondly, when a device chooses to offload a task to an edge server for computation, it needs to select a suitable edge server enabling increased computational efficiency. Meanwhile, the edge server also needs to allocate appropriate computing resources to the task to be offloaded to it. Prior research work has generally focused only on the allocation of computing resources, but in practical scenarios, wireless network resources are also a key factor that limits task offloading. Therefore, it is necessary to combine computing resources, communication resources and computing models to optimize task offloading to obtain an optimal strategy for task offloading.

Thus, based on the above analysis, in the Industrial Internet of Things that combines edge computing and industrial wireless technologies, there is an urgent need for an effective task offloading method and resource allocation strategy that can minimize a device's task processing overhead and meet the delay requirements for real time storage and processing of industrial data.

Therefore, those skilled in the art are directing their effort toward developing a method for task offloading based on power control and resource allocation in the Industrial Internet of Things.

SUMMARY OF THE INVENTION

In view of the above described shortcomings of the prior art, the technical problem to be solved by the present invention is to provide a method of computing task offloading in the Industrial Internet of Things to achieve communication power optimization and cross-domain resource allocation. This method, on the premise of satisfying the communication power requirements and computing capacity constraints of devices, through communication power control, allocation of computing resources of edge servers, offloading location decision and the like for devices in different cluster domains, achieves the minimization of task offloading overhead.

To achieve the above objects, the present invention provides a method for task offloading based on power control and resource allocation in the Industrial Internet of Things, comprising the steps of:

Step 1: configuring an Industrial Internet of Things network, wherein the Industrial Internet of Things network comprises a plurality of switches and a plurality of devices, the plurality of switches communicating with one another in a wired fashion. The method may include partitioning the Industrial Internet of Things network into a plurality of cluster domains according to communication coverage ranges of the plurality of switches, wherein each of the plurality of cluster domains comprises one edge server and at least one device of the plurality of devices, the at least one device wirelessly communicating with a switch in the cluster domain where it is in, computing capacity of the edge server being $f_j^S$, computing capacity of each of the at least one device being $f_i^L$, each of the at least one device configured to generate one computation task $Q_i$, the computation task $Q_i$ configured to contain a task data volume indicator $d_i$ and a task computational load indicator $c_i$. The method may include configuring offloading locations for the computation task, wherein the offloading locations include a first offloading location, a second offloading location and a third offloading location, wherein the first offloading location is the device itself, the second offloading location is a second edge server, the second edge server comprising the edge server in the cluster domain where the device is in, the device offloading, via the second switch, the computation task to the second edge server for computation, the second switch comprising the switch in the cluster domain where the device is in, the second edge server configured to allocate, to the computation task offloaded to it, a certain proportion of computing resources, and the third offloading location is a third edge server, the third edge server comprising the edge server in another cluster domain where the device is not in, the device offloading, via the second switch and a third switch, the computation task to the third edge server for computation, the third switch comprising a switch in the cluster domain where the third edge server is in, the third edge server configured to allocate, to the computation task offloaded to it, a certain proportion of computing resources.

In the case of the computation task being executed at the first offloading location, the method may include establishing a first computing model. In the case of the computation task being executed at the second offloading location, the method may include establishing a second computing model. In the case of the computation task being executed at the third offloading location, the method may include establishing a third computing model.

Step 2: based on the first computing model, the second computing model and the third computing model, establishing a total overhead model for all the computation tasks in the Industrial Internet of Things network, constructing an objective function and constructing a mixed integer non-linear programming problem.

Step 3: decomposing the non-linear programming problem in Step 2 into a communication power optimization problem and a computing resource allocation problem, obtaining optimal communication power at an extreme value point or a boundary of a domain of definition of the communication power optimization problem, using a method of Lagrange multipliers and a system of simultaneous equations of KKT conditions to derive an optimal computing resource allocation strategy for computing resource allocation, substituting the optimal communication power and the optimal computing resource allocation strategy into the objective function to obtain an offloading location decision problem model.

Step 4: based on the offloading location decision problem model obtained in Step 3, establishing a reinforcement learning model, using a deep reinforcement learning algorithm to train parameters of a depth neural network so as to maximize a cumulative reward of the reinforcement learning model from multi-step iteration, obtaining an optimal offloading location decision for the computation tasks, obtaining a joint optimization strategy comprising the optimal communication power, the optimal computing resource allocation strategy and the optimal offloading location decision.

Further, the first computing model comprises first time consumption, first energy consumption and first overhead.

Further, the first time consumption is $$t_i^L = \frac{c_i}{f_i^L}.$$

Further, the first energy consumption is $e_i^L = \zeta_i (f_i^L)^2 c_i$, where $\zeta_i$ is an energy consumption density of the device i for execution of the computation task.

Further, the first overhead is $u_i^L = \alpha_i \cdot t_i^L + (1-\alpha_i) \cdot e_i^L$, where $\alpha_i$ is a weight factor and $\alpha_i \in (0,1)$.

Additionally, the second computing model comprises second time consumption, second energy consumption and second overhead.

Further, the second time consumption is $$t_i^{LS} = \frac{d_i}{r_i} + \frac{c_i}{\kappa_i^{\gamma_i} f_{\gamma_i}^S} = \frac{d_i}{B_i \log_2\left(1 + \frac{p_i g_i}{N_0 B_i}\right)} + \frac{c_i}{\kappa_i^{\gamma_i} f_{\gamma_i}^S}$$

where $\gamma_i$ represents the second edge server that executes the computation task $Q_i$ and $\gamma_i \in \{1,2,\ldots,N\}$, $\kappa_i^{\gamma_i}$ represents a proportion of computing capacity allocated by the second edge server $\gamma_i$ to the computation task $Q_i$, a total wireless communication bandwidth of the second switch $S_j$ is $B_j$, an ensemble of devices in the cluster domain where the device is in is $\Psi_j$, the size of an actual bandwidth allocated to the device i is $$B_i = \frac{d_i}{\sum_{k \in \psi_j} x_k \cdot d_k} \cdot B_j,$$

where $x_i$ is a binary variable, and $x_i=0$ means the computation task is executed at the first offloading location, while $x_i=1$ means the computation task is executed at the second edge server, the device i wirelessly communicates with the second switch using time division multiple access (TDMA) at a data transmission rate that is $$r_i = B_i \log_2\left(1 + \frac{p_i g_i}{N_0 B_i}\right)$$

where $p_i$ is communication transmission power of the device i, $g_i$ is a channel gain between the device i and the switch, $N_0$ is a single-sided power spectral density of channel noise.

Further, the second energy consumption is $$e_i^{LS} = p_i \cdot \frac{d_i}{r_i} = p_i \cdot \frac{d_i}{B_i \log_2\left(1 + \frac{p_i g_i}{N_0 B_i}\right)}.$$

Further, the second overhead is
$u_i^{LS} = \alpha_i \cdot t_i^{LS} + (1-\alpha_i) \cdot e_i^{LS}$, where $\alpha_i$ is a weight factor and $\alpha_i \in (0,1)$.

Further, the third computing model comprises third time consumption, third energy consumption and third overhead.

Further, a data transmission rate between the second switch and the third switch is a constant $r_w$; the third time consumption is $$t_i^{OS} = \frac{d_i}{r_i} + \frac{d_i}{r_w} + \frac{c_i}{\kappa_i^{\gamma_i} f_{\gamma_i}^S} = \frac{d_i}{B_i \log_2\left(1 + \frac{p_i g_i}{N_0 B_i}\right)} + \frac{d_i}{r_w} + \frac{c_i}{\kappa_i^{\gamma_i} f_{\gamma_i}^S}$$

where $d_i/r_i$ is a transmission time for the device to offload the computation task to the second switch, $d_i/r_w$ is a transmission time for the second switch to offload the computation task to the third switch, $$\frac{c_i}{\kappa_i^{\gamma_i} f_{\gamma_i}^S}$$

is a computation time of the computation task on the third edge server, $\gamma_i$ represents the third edge server that executes the computation task $Q_i$ and $\gamma_i \in \{1,2,\ldots,N\}$, $\kappa_i^{\gamma_i}$ represents a proportion of computing capacity allocated by the third edge server $\gamma_i$ to the computation task $Q_i$;

a total wireless communication bandwidth of the second switch $S_j$ is $B_j$, an ensemble of devices in the cluster domain where the device is in is $\Psi_j$, the size of an actual bandwidth allocated to the device i is $$B_i = \frac{d_i}{\sum_{k \in \psi_j} x_k \cdot d_k} \cdot B_j,$$

where $x_i$ is a binary variable and $x_i=0$ means the computation task is executed at the first offloading location, while $x_i=1$ means the computation task is executed at the third edge server;

the device i wirelessly communicates with the second switch using time division multiple access (TDMA) at a data transmission rate that is $$r_i = B_i \log_2\left(1 + \frac{p_i g_i}{N_0 B_i}\right)$$

where $p_i$ is communication transmission power of the device i, $g_i$ is a channel gain between the device i and the switch, $N_0$ is a single-sided power spectral density of channel noise.

Further, the third energy consumption is $$e_i^{OS} = p_i \cdot \frac{d_i}{r_i} = p_i \cdot \frac{d_i}{B_i \log_2\left(1 + \frac{p_i g_i}{N_0 B_i}\right)}.$$

Further, the third overhead is $u_i^{OS} = \alpha_i \cdot t_i^{OS} + (1-\alpha_i) \cdot e_i^{OS}$.

Further, establishing the total offloading overhead model for all the computation tasks in the Industrial Internet of Things network in Step 2 comprises: defining a first decision variable $x_i = \{0,1\}$, wherein $x_i=0$ means the computation task is executed at the first offloading location, while $x_i=1$ means the computation task is offloaded to the edge server for computation; defining a second decision variable $\beta_i = \{0,1\}$, wherein $\beta_i=0$ means the computation task is executed at the first offloading location or the second offloading location, while $\beta_i=1$ means the computation task is executed at the third offloading location; defining a third decision variable $\gamma_i$, wherein $\gamma_i$ represents the edge server that executes the computation task and $\gamma_i \in \{1,2,\ldots,N\}$, overhead for the computation task $Q_i$ is $$u_i = (1-x_i)u_i^L + x_i(u_i^{LS} + \beta_i(u_i^{OS} - u_i^{LS})),$$

total overhead for all the computation tasks in the Industrial Internet of Things network is $$U = \sum_{i=1}^{M} u_i = \sum_{i=1}^{M} [(1-x_i)u_i^L + x_i(u_i^{LS} + \beta_i(u_i^{OS} - u_i^{LS}))].$$

Further, constructing the mixed integer non-linear programming problem in Step 2 comprises:

constructing an objective function $$f(\kappa, p, x, \gamma, \beta) = \sum_{i=1}^{M} u_i = \sum_{i=1}^{M} [(1-x_i)u_i^L + x_i(u_i^{LS} + \beta_i(u_i^{OS} - u_i^{LS}))] =$$

$$\sum_{i=1}^{M} \left[(1-x_i)u_i^L + x_i \left(\alpha_i \cdot \left(\frac{d_i}{B_i \log_2\left(1 + \frac{p_i g_i}{N_0 B_i}\right)} + \frac{c_i}{\kappa_i^{\gamma_i} f_{\gamma_i}^S}\right) + \right.\right.$$

$$\left.\left.(1-\alpha_i) \cdot p_i \cdot \frac{d_i}{B_i \log_2\left(1 + \frac{p_i g_i}{N_0 B_i}\right)} + \alpha_i \cdot \beta_i \cdot \frac{d_i}{r_w}\right)\right]$$

where, constraints are:

$$\sum_{i \in O_{\gamma_i}} \kappa_i^{\gamma_i} \leq 1;$$

$p_i \leq p_i^{max}$; $x_i \in [0,1]$, $l=1,2,\ldots,n$; $\beta_t \in \{0,1\}$, $t=1,2,\ldots,m$; $\gamma_i \in \{1,2,\ldots,n\}$; $O_{\gamma_i}$ represents a set of computation tasks processed on the edge server $\gamma_i$, the optimization variables $\kappa_i^{\gamma_i}$, $p_i$ are continuous variables, $x_i$, $\beta_i$ and $\gamma_i$ are integer variables.

Further, Step 3 comprises: according to the offloading location where the computation task is executed, substituting a set of feasible solutions, $x^0$, $\beta^0$ and $\gamma^0$, into the objective function to obtain a function of the continuous variable $\kappa_i$ and a function of the continuous variable $p_i$; transforming the function of the continuous variable $p_i$ into a communication power optimization problem and solving it to obtain the optimal communication power $p^*_i$; transforming the function of the continuous variable $\kappa_i$ into a computing resource allocation problem and solving it to obtain the optimal computing resource allocation strategy $\kappa^*_i$; substituting the optimal communication power $p^*_i$ and the optimal computing resource allocation strategy $\kappa^*_i$ into the original objective function to obtain the offloading location decision problem expressed as:

$$f(x, \gamma, \beta) = \sum_{i=1}^{M} \left[(1-x_i)u_i^L + x_i \left(\alpha_i \cdot \left(\frac{d_i}{B_i \log_2\left(1 + \frac{p_i^* g_i}{N_0 B_i}\right)} + \frac{c_i}{\kappa_i^* f_{\gamma_i}^S}\right) + \right.\right.$$

$$\left.\left.(1-\alpha_i) \cdot p_i^* \cdot \frac{d_i}{B_i \log_2\left(1 + \frac{p_i^* g_i}{N_0 B_i}\right)} + \alpha_i \cdot \beta_i \cdot \frac{d_i}{r_w}\right)\right]$$

Further, the communication power optimization problem is configured to leverage the nature of the function to solve the optimal communication power.

Further, the computing resource allocation problem is configured to first leverage the convex optimization theory to make a decision and then use a method of Lagrange multipliers and KKT (Karush-Kuhn-Tucker) conditions to solve the optimal allocation strategy.

Further, Step 4 comprises:

Step 4.1: defining a state, an action and a reward;

Step 4.2: initializing a memory buffer area, the memory buffer area configured to store at least one set of memory data, the memory data comprising a current state, a current action, a current reward and a subsequent state, and initializing a weight of a value function network to make network parameters of the objective function the same as network parameters of the value function;

Step 4.3: initializing a state of the value function network, computing total time consumption T and total energy consumption E of all the computation tasks, taking a result of the computation as a state $s_1$, and inputting the state $s_1$ to the value function network to obtain corresponding outputs of the value function in response to different actions taken in the state $s_1$;

Step 4.4: selecting a current action using a ε-greedy strategy, after executing the current action, obtaining an immediate reward and proceeding to the next state obtaining an immediate reward and proceeding to the next state $s_{t+1}$, storing each set of the memory data in the memory buffer area;

Step 4.5: stochastically sampling a plurality of the memory data from the memory buffer area, in case of the current state being a final state, configuring a temporal difference target as $r_j$, in case of the current state not being a final state, inputting each of the plurality of the memory data to the objective function network to compute the temporal difference target, the objective function giving a network output as $$r + \gamma \max_{a'} Q(s', a'; \theta^-);$$

Step 4.6: taking the network outputs of the value function as estimated values, taking the network outputs of the objective function as a labeled value, using an SGD (Stochastic Gradient Descent) algorithm to update the network parameters of the value function, wherein an expression of the SGD algorithm is $$\Delta \theta = \nabla Q(s, a; \theta) \times \alpha \left[ r + \gamma \max_{a'} Q(s', a'; \theta^-) - Q(s, a; \theta) \right],$$

the network parameters of the value function are configured to be updated according to the formula $\theta = \theta + \Delta\theta$;

Step 4.7: repeating Steps 4.4 to 4.6 until the network parameters of the value function are updated for a fixed number of times, valuing the objective function network with the network parameters of the value function in the current state, outputting an optimal state and an action associated with the optimal state.

Further, the state comprises the total time consumption T and the total energy consumption E of all the computation tasks, the total time consumption T being the sum of the first time consumption, the second time consumption and the third time consumption of all the computation tasks, the total energy consumption E being the sum of the first energy consumption, the second energy consumption and the third energy consumption of all the computation tasks;

the action comprises a first decision variable vector $[x_1, x_2, \ldots, x_m]$ a second decision variable vector $[\beta_1, \beta_2, \ldots, \beta_m]$ and a third decision variable vector $[\gamma_1, \gamma_2, \ldots, \gamma_m]$, wherein the first decision variable vector is configured to determine whether the computation tasks need to be offloaded, the second decision variable vector is configured to determine whether the computation tasks are computed on the edge servers in the cluster domains where the devices are in, the third decision variable vector is configured to determine the edge servers where the computation tasks are on, an action space of the action is $\alpha=[x_1, x_2, \ldots, x_m, \beta_1, \beta_2, \ldots, \beta_m, \gamma_1, \gamma_2, \ldots, \gamma_m]$;

the reward is configured as a reward function $$r = \frac{U_{local} - U}{U_{local}},$$

where $U_{local}$ is total overhead when all the computation tasks are computed at the first offloading locations, U is total overhead required to complete all the computation tasks under the current decision.

The present invention is based on cross-domain offloading in the Industrial Internet of Things to construct a computation task offloading model in a cross-domain network, which minimizes offloading overhead for all computation tasks, thus satisfying the requirements of computation-intensive tasks in an industrial environment on computation energy consumption and processing delay. The present invention takes into account communication power optimization, computing resource allocation and offloading location decision problems, establishes a mixed integer non-linear programming problem and decompose the problem into three optimization sub-problems which are then solved. For the offloading location decision problem, a deep reinforcement learning algorithm is adopted to solve it, and a reinforcement learning model for task offloading in the cross-domain network is constructed. This not only can reduce task offloading overhead but also has low temporal complexity.

Below, the concept, structural details and resulting technical effects of the present invention will be further described with reference to the accompanying drawings to provide a full understanding of the objects, features and effects of the invention.

DETAILED DESCRIPTION OF THE PREFERRED EMBODIMENTS

Below, the accompanying drawings of this specification are referenced to introduce many preferred embodiments of the present invention so that the techniques thereof become more apparent and readily understood. The present invention may be embodied in many different forms of embodiment, and the protection scope of the invention is not limited only to the embodiments mentioned herein.

Figure 1:
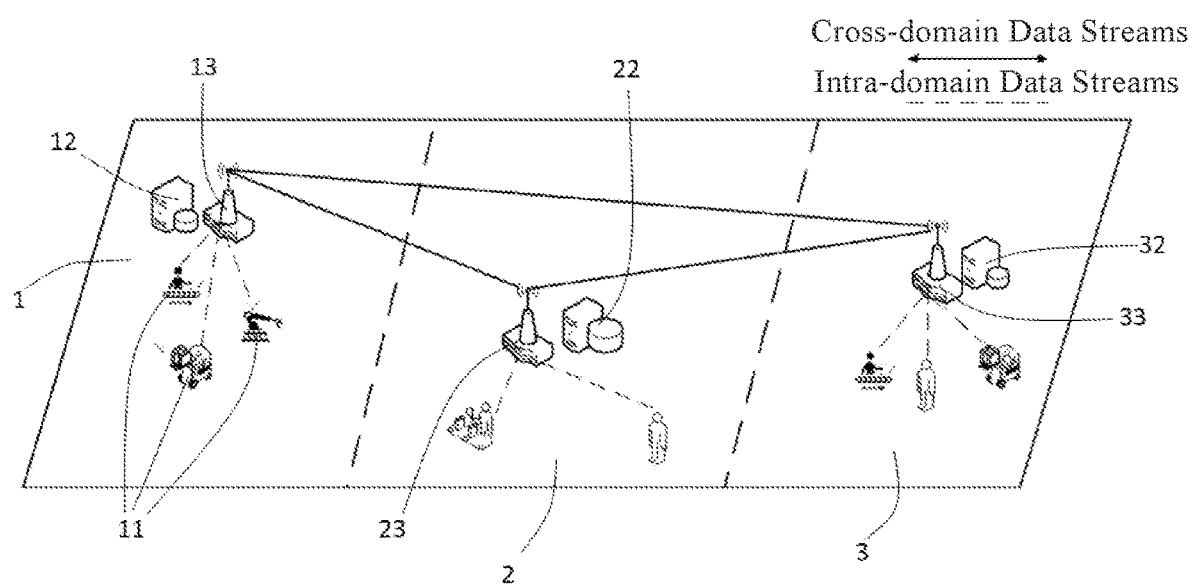
FIG. 1 is a schematic diagram of a cross-domain network based computation task offloading model of the present invention.

Throughout the accompanying drawings, structurally identical parts are indicated with identical reference numerals, and structurally or functionally similar components are indicated with similar reference numerals. The size and thickness of each component in the drawings are arbitrarily depicted, and the present invention is not limited to any size or thickness of each component. For greater clarity of illustration, the thicknesses of some parts are exaggerated as appropriate somewhere in the drawings.

Shown in FIG. 1 is a cross-domain network based computation task offloading model.

Figure 2:
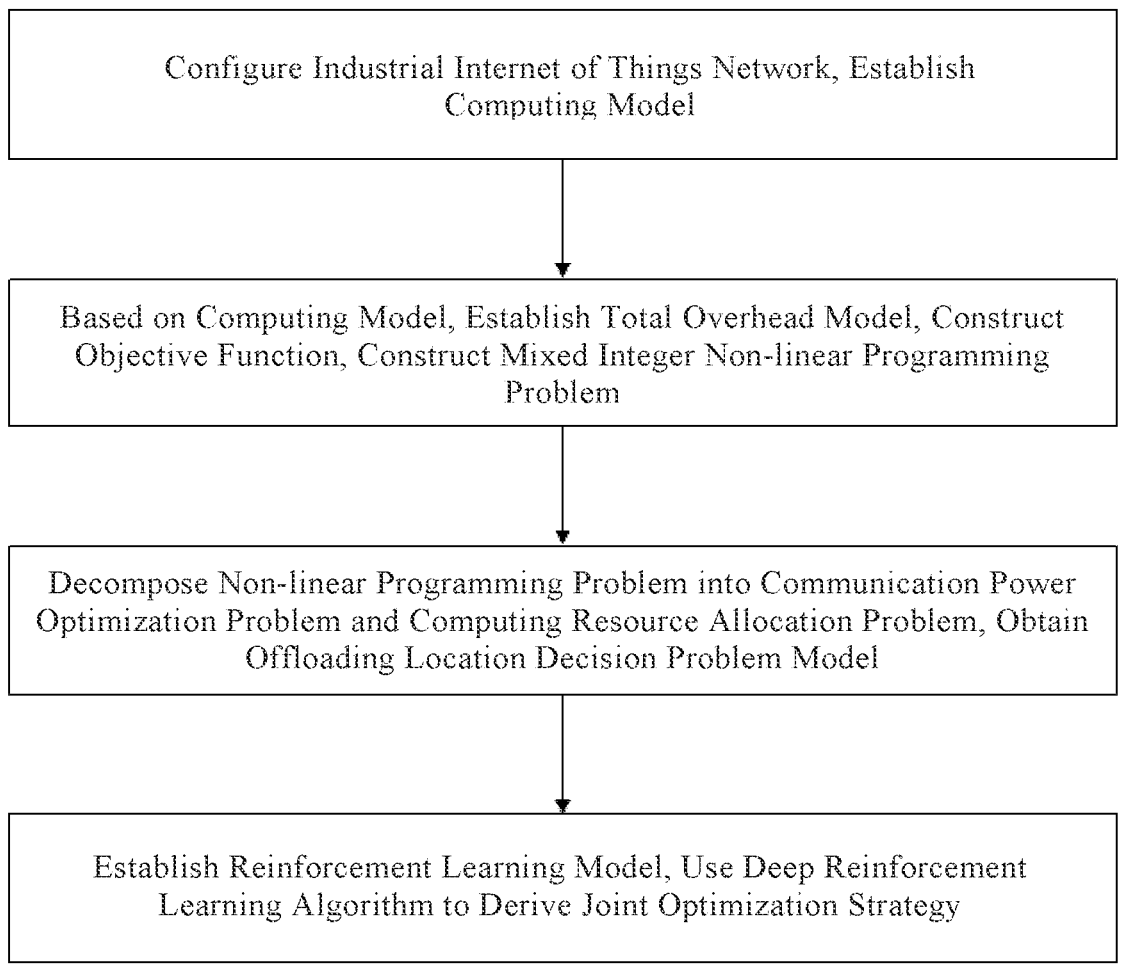
FIG. 2 is a schematic flow diagram of a task offloading method of the present invention.

A method used thereby for task offloading based on power control and resource allocation includes the steps as follows, with reference to FIG. 2:

Step 1: configure an Industrial Internet of Things network, wherein, the Industrial Internet of Things network includes a plurality of switches and a plurality of devices, and the plurality of switches communicate with one another in a wired fashion. The plurality of devices may be any device used at industrial site, including, but not limited to, machines that produce products, product transportation devices such as AGVs and hoisting machinery, and detection devices.

According to communication coverage ranges of the plurality of switches, the Industrial Internet of Things network is partitioned into a plurality of cluster domains.

Each of the plurality of cluster domains includes one edge server and at least one device. The device in each cluster domain communicates with a switch in the cluster domain wirelessly, and through the switch in the cluster domain where it is in, offloads a computation task to an edge server in this cluster domain for computation. Devices cannot directly communicate with switches in different cluster domains, but switches in different cluster domains can communicate with one another in a wired fashion. Therefore, a computation task from a device in a cluster domain can be offloaded by a switch in this cluster domain to the edge server in another cluster domain for computation. Computing capacity of the edge server is denoted as $f_j^S$, and computing capacity of each device is denoted as $f_i^L$. Each device is configured to generate one computation task $Q_i$. The computation task $Q_i$ is configured to contain a data volume indicator $d_i$ of the task and a computational load indicator $c_i$ of the task.

Offloading locations for the computation task are configured. As shown in FIG. 1, a device 11 in a first cluster domain 1 will be described to exemplify the offloading location configuration process for the computation task. It should be understood that computation tasks generated by devices in other cluster domains are subject to offloading location configuration processes all following the same steps.

The offloading locations include a first offloading location, a second offloading location and a third offloading location, wherein the first offloading location is the device 11 itself that generates the computation task. The second offloading location is a second edge server. The second edge server includes an edge server 12 in the first cluster domain 1 where the device 11 is in. The device 11 offloads, via a second switch, the computation task to the second edge server 12 for computation. The second switch includes a switch 13 in the first cluster domain 1 where the device 11 is in. The second edge server is configured to allocate, to the computation task offloaded to it, a certain proportion of computing resources. The third offloading location is a third edge server. The third edge server includes the edge server in another cluster domain where the device 11 is not in, such as an edge server 22 in a second cluster domain 2, or an edge server 23 in a third cluster domain 3. The device 11 offloads, via the second switch and a third switch, the computation task to the third edge server for computation. The third switch includes a switch in another cluster domain where the device 11 is not in, such as a switch 23 in the second cluster domain 2, or an edge server 33 in the third cluster domain 3. The third edge server is configured to allocate, to the computation task offloaded to it, a certain proportion of computing resources.

In case of the computation task being executed at the first offloading location, a first computing model is established.

In case of the computation task being executed at the second offloading location, a second computing model is established.

In case of the computation task being executed at the third offloading location, a third computing model is established.

Step 2: Based on the first computing model, the second computing model and the third computing model, establish a total overhead model for all the computation tasks in the Industrial Internet of Things network, and construct a mixed integer non-linear programming problem.

Step 3: Decompose the non-linear programming problem in Step 2 into a communication power optimization problem and a computing resource allocation problem, obtain optimal communication power at an extreme value point or a boundary of a domain of definition of the communication power optimization problem, use a method of Lagrange multipliers and a system of simultaneous equations of KKT conditions to derive an optimal computing resource allocation strategy for computing resource allocation, substitute the optimal communication power and the optimal computing resource allocation strategy into the objective function to obtain an offloading location decision problem model.

Step 4: Based on the communication power and the computing resource allocation strategy obtained in Step 3, establish a reinforcement learning model, use a deep reinforcement learning algorithm to train parameters of a depth neural network so as to maximize a cumulative reward of the reinforcement learning model from multi-step iteration, obtain an optimal offloading location decision for the computation tasks, obtain a joint optimization strategy including the optimal communication power, the optimal computing resource allocation strategy and the optimal offloading location decision.

In Step 1, n switches are arranged in an industrial network system, and according to communication coverage ranges of these switches, the network is partitioned into n cluster domains. Aside each switch, there is arranged one edge server with computing capacity of $f_j^S$. In the network, there are m on-site devices scattered in the n cluster domains. Computing capacity of each on-site device is $f_i^L$, and each device will generate one computation task $Q_i$. The task $Q_i$ includes two indicators: data volume size $d_i$ of the task and computational load $c_i$ of the task. Each task is made available with three computation options, which are respectively computation on the specific device, computation on the edge server in the respective cluster domain, and computation on the edge server in another cluster domain.

Computation on the device (first computing model):
First time consumption of computation on the device is $$t_i^L = \frac{c_i}{f_i^L}$$

First energy consumption of computation on the device is $e_i^L = \zeta_i (f_i^L)^2 c_i$, where $\zeta_i$ is an energy consumption density for computation on the device i.

First overhead for computation on the device is $u_i^L = \alpha_i \cdot t_i^L + (1-\alpha_i) \cdot e_i^L$, where $\alpha_i$ is a weight factor and $\alpha_i \in (0,1)$.

Offloading of the computation task to the edge server in the respective cluster domain where the device is in and computation thereon (second computing model).

Time consumption of computation on the edge server in the local cluster domain is a task transmission time plus a computation time. At first, a wireless transmission model is established.

Within the same cluster domain, during a data uploading process from a device to the switch, a single wireless frequency is used. As uplinks of different devices suffer from interference with one another, which affects the transmission rate and transmission quality, a time division multiple access (TDMA) technique is employed. The TDMA technique divides time into periodic, non-overlapping frames, and each TDMA frame is divided into a number of time slots. Devices transmit data in the respectively assigned time slots, enabling many-to-one communication without mutual interference. This increases the utilization of wireless channel resources and, at locations with heavy network load, allows for desirable utilization of wireless channels, ensuring transmission quality and rate and providing tasks with real time guarantees. Since tasks from devices in the cluster domain are offloaded to different locations and have different requirements on channel resources, a dynamic time slot allocation algorithm is adopted, in which only when a device is in need of data transmission, it is allocated with a time slot. This avoids interference with the uplink of another device and increases time slot utilization.

A TDMA frame is structured to contain header bits, several time slots and tail bits. Each time slot contains information such as synchronization bits, user information bits and guard bits. Among these, data to be transmitted is contained in the user information bits, and is also a main part of TDMA frame transmission. If a total wireless communication bandwidth for the switch j in the cluster domain is $B_j$, then a total bandwidth that one TDMA frame can allocate will be $B_j$. It is necessary to, according to the number of devices in need of offloading and data volumes of the tasks in the cluster domain, to carry out time slot and bandwidth allocation for the devices. Assuming that, in the cluster domain of the switch $S_j$, a corresponding ensemble of devices is $$B_i = \frac{d_i}{\sum_{k \in \Psi_j} x_k \cdot d_k} \cdot B_j$$

$\Psi_j$, and that corresponding rules are determined according to the actual topology of the network, then according to the dynamic time slot allocation algorithm, time slot and bandwidth allocation is carried out for devices in need of task offloading. Allocation proportions are determined according to data volume sizes of the tasks. Then, the size of an actual bandwidth allocated to the device i is:

where $x_i$ is a binary variable. $x_i=0$ means the task is computed on the device, while $x_i=1$ means the task is offloaded to the edge server for computation.

The Shannon formula is used to derive a data transmission rate at which the device transmits the task:

$$r_i = B_i \log_2\left(1 + \frac{p_i g_i}{N_0 B_i}\right)$$

where $B_i$ is a wireless channel bandwidth allocated to the device i, $p_i$ is communication transmission power of the device, $g_i$ is a channel gain between the device i and the switch, $N_0$ is a single-sided power spectral density of channel noise. Second time consumption can be obtained as $$t_i^{LS} = \frac{d_i}{B_i \log_2\left(1 + \frac{p_i g_i}{N_0 B_i}\right)} + \frac{c_i}{\kappa_i^{\gamma_i} f_{\gamma_i}^S}$$

where $\gamma_i$ denotes the location of the edge server for the computation task $Q_i$ and $\gamma_i \in \{1, 2, \ldots, N\}$, $\kappa_i^{\gamma_i}$ represents a proportion of computing capacity allocated by the edge server $\gamma_i$ to the task $Q_i$. As what is to be optimized according to the present invention takes into account only the device, energy consumption is equal to the second energy consumption of the device for transmitting the task to the switch in the respective cluster domain. That is, $$e_i^{LS} = p_i \cdot \frac{d_i}{r_i} = p_i \cdot \frac{d_i}{B_i \log_2\left(1 + \frac{p_i g_i}{N_0 B_i}\right)}$$

Second overhead for computation in the respective cluster domain is $$u_i^{LS} = \alpha_i \cdot t_i^{LS} + (1-\alpha_i) \cdot e_i^{LS} =$$

$$\alpha_i \cdot \left(\frac{d_i}{B_i \log_2\left(1 + \frac{p_i g_i}{N_0 B_i}\right)} + \frac{c_i}{\kappa_i^{\gamma_i} f_{\gamma_i}^S}\right) + (1-\alpha_i) \cdot p_i \cdot \frac{d_i}{B_i \log_2\left(1 + \frac{p_i g_i}{N_0 B_i}\right)}$$

Offloading of the computation task to the edge server in another cluster domain and computation thereon (third computing model).

For offloading the computation task to the edge server in another cluster domain, the transmission path is two-hop, i.e., first from the device to the switch in the local cluster domain, and then from the switch in the local cluster domain to the switch in the destination cluster domain. The switches in different cluster domains are connected in a wired fashion, and a data transmission rate between them is a constant $r_w$. Time consumption of computation of the computation task on the edge server in the other cluster domain consists of three parts: a transmission time for the device to offload the task to the switch in the respective cluster domain, a transmission time for the switch in the respective cluster domain to offload the task to the switch in the destination cluster domain, and a computation time of the task on the edge server in the destination cluster domain. Therefore, third time consumption is $$t_i^{OS} = \frac{d_i}{r_i} + \frac{d_i}{r_w} + \frac{c_i}{\kappa_i^{\gamma_i} f_{\gamma_i}^S} = \frac{d_i}{B_i \log_2\left(1 + \frac{p_i g_i}{N_0 B_i}\right)} + \frac{d_i}{r_w} + \frac{c_i}{\kappa_i^{\gamma_i} f_{\gamma_i}^S}$$

Third energy consumption is $$e_i^{OS} = p_i \cdot \frac{d_i}{r_i} = p_i \cdot \frac{d_i}{B_i \log_2\left(1 + \frac{p_i g_i}{N_0 B_i}\right)}$$

Here, similarly, only energy consumption for the device to transmit the task to the switch in the respective cluster domain is considered.

Third overhead is $u_i^{OS} = \alpha_i \cdot t_i^{OS} + (1-\alpha_i) \cdot e_i^{OS}$.

Step 2 specifically involves:

based on the three computing models established in Step 1, establishing a total overhead model for the offloading of the computation task. First of all, a decision variable $x_i = \{0, 1\}$ is defined so that $x_i = 0$ means the computation task is computed on the local device, while $x_i = 1$ means the computation task is offloaded to an edge server for computation. A decision variable $\beta_i = \{0,1\}$ is defined so that $\beta_i = 0$ means the computation task is executed on the edge server in the respective cluster domain, while $\beta_i = 1$ means the computation task is executed on the edge $$U = \sum_{i=1}^{M} u_i = \sum_{i=1}^{M} \left[ (1-x_i)u_i^L + x_i \left( u_i^{LS} + \beta_i \left( u_i^{OS} - u_i^{LS} \right) \right) \right]$$

server in another cluster domain. The location of an edge server is denoted as $\gamma_i$, where $\gamma_i \in \{1,2,\ldots,N\}$. Total overhead for offloading of the computation task $Q_i$ is $u_i = (1-x_i)u_i^L + x_i(u_i^{LS} + \beta_i(u_i^{OS} - u_i^{LS}))$. Thus, total overhead for offloading of all the computation tasks in the Industrial Internet of Things network is:

The following objective function is constructed:

$$f(\kappa, p, x, \gamma, \beta) =$$

$$\sum_{i=1}^{M} u_1 = \sum_{i=1}^{M} \left[ (1-x_i)u_i^L + x_i \left( u_i^{LS} + \beta_i \left( u_i^{OS} - u_i^{LS} \right) \right) \right] = \sum_{i=1}^{M} \left[ (1-x_i)u_i^L + x_i \left( \alpha_i \cdot \left( \frac{d_i}{B_i \log_2 \left( 1 + \frac{p_i g_i}{N_0 B_i} \right)} + \frac{c_i}{\kappa_i^{\gamma_i} f_{\gamma_i}^S} \right) + (1-\alpha_i) \cdot p_i \cdot \frac{d_i}{B_i \log_2 \left( 1 + \frac{p_i g_i}{N_0 B_i} \right)} + \alpha_i \cdot \beta_i \cdot \frac{d_i}{r_w} \right) \right]$$

Constraints of this function are:

$$\sum_{i \in O_{\gamma_i}} \kappa_i^{\gamma_i} \leq 1;$$

$p_i \leq p_i^{max}$; $x_i \in \{0,1\}$, $l=1,2,\ldots,m$; $\beta_i \varepsilon \{0,1\}$, $l=1,2,\ldots,m$; $\gamma_i \in \{1,2,\ldots,N\}$. Where, $O_{\gamma_i}$ represents a set of computation tasks processed on the edge server $\gamma_i$, the optimization variables $\kappa_i^{\gamma_i}$, $p_i$ are continuous variables, $x_i$, $\beta_i$ and $\gamma_i$ are integer variables. As such, a mixed integer non-linear programming problem is constructed.

In Step 3, the mixed integer non-linear programming problem constructed in Step 2 is solved.

In Step 3, a given set of feasible solutions corresponding to the offloading location of the computation task, $x^0$, $\beta^0$ and $\gamma^0$, is substituted into the original objective function. Assuming there are l on-site devices choosing to offload the computation tasks to edge servers for processing, in which p devices choose to offload the tasks to the edge servers in other cluster domains for processing and the remaining devices choose local computation, then in the objective function, there remain only the continuous variables $\kappa_i$ and $p_i$. The objective function is expressed as:

$$f(\kappa, p) = \sum_{i=1}^{l} \left[ \alpha_i \cdot \left( \frac{d_i}{B_i \log_2 \left( 1 + \frac{p_i g_i}{N_0 B_i} \right)} + \frac{c_i}{\kappa_i^{\gamma_i} f_{\gamma_i}^S} \right) + (1-\alpha_i) \cdot p_i \cdot \frac{d_i}{B_i \log_2 \left( 1 + \frac{p_i g_i}{N_0 B_i} \right)} \right] + \sum_{i=1}^{p} \alpha_i \cdot \frac{d_i}{r_w} + \sum_{i=M-l+1}^{M} \alpha_i \cdot \frac{c_i}{f_i^L}$$

The non-linear programming problem is decomposed into a communication power optimization problem and a computing resource allocation problem. The following functions and constraints are obtained:

$$g(p) = \sum_{i=l}^{l} \left[ \alpha_i \cdot \frac{d_i}{B_i \log_2 \left( 1 + \frac{p_i g_i}{N_0 B_i} \right)} + (1-\alpha_i) \cdot p_i \cdot \frac{d_i}{B_i \log_2 \left( 1 + \frac{p_i g_i}{N_0 B_i} \right)} \right]$$

with the corresponding constraint $p_i \leq p_i^{max}$; and $$h(\kappa) = \sum_{i=1}^{l} \alpha_i \cdot \frac{c_i}{\kappa_i^{\gamma_i} f_{\gamma_i}^S} + \sum_{i=1}^{p} \alpha_i \cdot \frac{d_i}{r_w} + \sum_{i=M-l+1}^{M} \alpha_i \cdot \frac{c_i}{f_i^L}$$

with the corresponding constraint $$\sum_{i \in O_{\gamma_i}} \kappa_i^{\gamma_i} \leq 1.$$

For the communication power optimization problem $g(p)$, parameter substitutions are made by letting $$A = \frac{\alpha_i \cdot d_i}{B_i}, B = \frac{(1-\alpha_i) \cdot d_i}{B_i}, C = \frac{g_i}{N_0 B_i},$$

$q_i = \log_2(1 + C \cdot p_i)$. Thus, $$p_i = \frac{2^{q_i} - 1}{C},$$

and the original function is transformed into $$G(q_i) = A \cdot \frac{1}{q_i} + B \cdot \frac{2^{q_i} - 1}{C \cdot q_i}.$$

A first-order derivative of this is obtained as $$G'(q_i) = -A \cdot \frac{1}{q_i^2} + \frac{B}{C} \cdot \frac{\ln 2 \cdot q_i \cdot 2^{q_i} - 2^{q_i} + 1}{q_i^2},$$

and a second-order derivative as $$G''(q) = \frac{2A}{q_i^3} + \frac{B}{c} \cdot \frac{(\ln 2)^2 \cdot q_i^2 \cdot 2^{q_i} + 2 \cdot 2^{q_i} - 2\ln 2 \cdot q_i \cdot 2^{q_i} - 2}{q_i^3} =$$

$$\frac{2A}{q_i^3} + \frac{B}{C} \cdot \frac{\ln 2 \cdot q_i \cdot 2^{q_i}(\ln 2 \cdot q_1 - 2) + 2 \cdot (2^{q_i} - 1)}{q_i^3}$$

Let $y = \ln 2 \cdot q_i \cdot 2^{q_i} (\ln 2 \cdot q_i - 2) + 2 \cdot (2^{q_i} - 1)$, $y' = (\ln 2)^2 \cdot q_i^2 \cdot 2^{q_i} > 0$. Thus, y monotonically increases in the domain of definition $q_i > 0$. Moreover, as $y(q_i = 0) = 0$, $$\frac{\ln 2 \cdot q_i \cdot 2^{q_i}(\ln 2 \cdot q_i - 2) + 2 \cdot (2^{q_i} - 1)}{q_i^3} > 0$$

is always true in the domain of definition $q_i > 0$. Therefore, $G''(q_i) > 0$, i.e., the function $G(q)$ is a convex function.

Since $G''(q_i) > 0$, $G'(q_i)$ monotonically increases in the domain of definition. Let $G'(q_i) = 0$, then we obtain the value of $q_i^0$ at which first-order derivative is zero. Thus, if $q_i \in (0, q_i^0)$ and $G'(q_i) < 0$, then $G(q)$ monotonically decreases. If $q_i \in (q_i^0, \infty)$ and $G'(q_i) > 0$, then $G(q)$ monotonically increases. From a range in which the value of $p_i$ is constrained, a range in which the value of $q_i$ is constrained is obtained as $$q_i \leq \log_2\left(1 + \frac{p_i^{max} g_i}{N_0 B_i}\right).$$

If $$q_i^0 \leq \log_2\left(1 + \frac{p_i^{max} g_i}{N_0 B_i}\right),$$

then the optimal value will be $q_i^0$. That is, $$p_i^* = \frac{(2^{q^0} - 1) N_0 B_i}{g_i}.$$

Otherwise, the optimal value will be $$\log_2\left(1 + \frac{p_i^{max} g_i}{N_0 B_i}\right).$$

That is, $p_i^* = p_i^{max}$.

Through calculating a Hessian matrix of the function $h(\kappa)$ over the variable $\kappa$, it can be proved that the function $h(\kappa)$ is a convex function over the variable $\kappa$. Moreover, since the constraints are linear, the resource allocation sub-problem is a convex optimization problem over the variable $\kappa$. A Lagrange function of $h(\kappa)$ is established as $$L(\kappa, v) = h(\kappa) - \sum_{j=1}^{n} v_j\left(1 - \sum_{i \in O_{\gamma_i}} \kappa_i^{\gamma_i}\right).$$

Solving it using the KKT conditions results in an optimal computing resource allocation strategy as $$\kappa_i^* = \frac{\sqrt{c_i}}{\sum_{i \in O_j} \sqrt{c_i}}.$$

By substituting the optimal communication power, $p^*_i$ and optimal computing resource allocation strategy $\kappa^*_i$ into the original objective function, we obtain an offloading location decision problem expressed as:

$$f(x, \gamma, \beta) = \sum_{i=1}^{M}\left[(1 - x_i)u_i^L + x_i\left(\alpha_i \cdot \left(\frac{d_i}{B_i \log_2\left(1 + \frac{p_i^* g_i}{N_0 B_i}\right)} + \frac{c_i}{\kappa_i^* f_{\gamma_i}^S}\right) + (1 - \alpha_i) \cdot p_i^* \cdot \frac{d_i}{B_i \log_2\left(1 + \frac{p_i^* g_i}{N_0 B_i}\right)} + \alpha_i \cdot \beta_i \cdot \frac{d_i}{r_w}\right)\right]$$

This offloading location decision problem is an integer linear programming problem over the variables $x_i$, $\beta_i$ and $\gamma_i$.

In Step 4, a deep reinforcement learning algorithm is adopted for solution. Reinforcement learning has three key components: state, action and reward. For the offloading location decision problem model in this application, the three components are defined as follows.

State: a state of the system is total time consumption T and total energy consumption E of all the tasks.

Action: an action of the system consist of three parts, which are respectively the variable $[x_1, x_2, \ldots, x_m]$ determining whether a task needs to be offloaded, the variable $[\beta_1, \beta_2, \ldots, \beta_m]$ determining whether a task is computed on the edge server in the respective cluster domain, and the variable $[\gamma_1, \gamma_2, \ldots, \gamma_m]$ of the edge server location for a computation task. Therefore, an action space is defined as $\alpha = [x_1, x_2, \ldots, x_m, \beta_1, \beta_2, \ldots, \beta_m, \gamma_1, \gamma_2, \ldots, \gamma_m]$.

Reward: when the system in a state s takes an action a to transition to the next state s', an immediate reward is given as R (s,a). The goal of reinforcement learning is to find a continuous optimal strategy that maximizes the total reward, while the objective function requires computation overhead for all the tasks to be shortest. Therefore, a reward of the system is defined as:

$$r = \frac{U_{local} - U}{U_{local}}$$

where $U_{local}$ is total overhead when all the tasks are computed on the devices, U is total overhead required to complete the tasks when the system takes the current decision. Therefore, the value of the objective function is negatively correlated to the reward function. At the maxima of the reward function, the minima of the objective function can be obtained.

Figure 3:
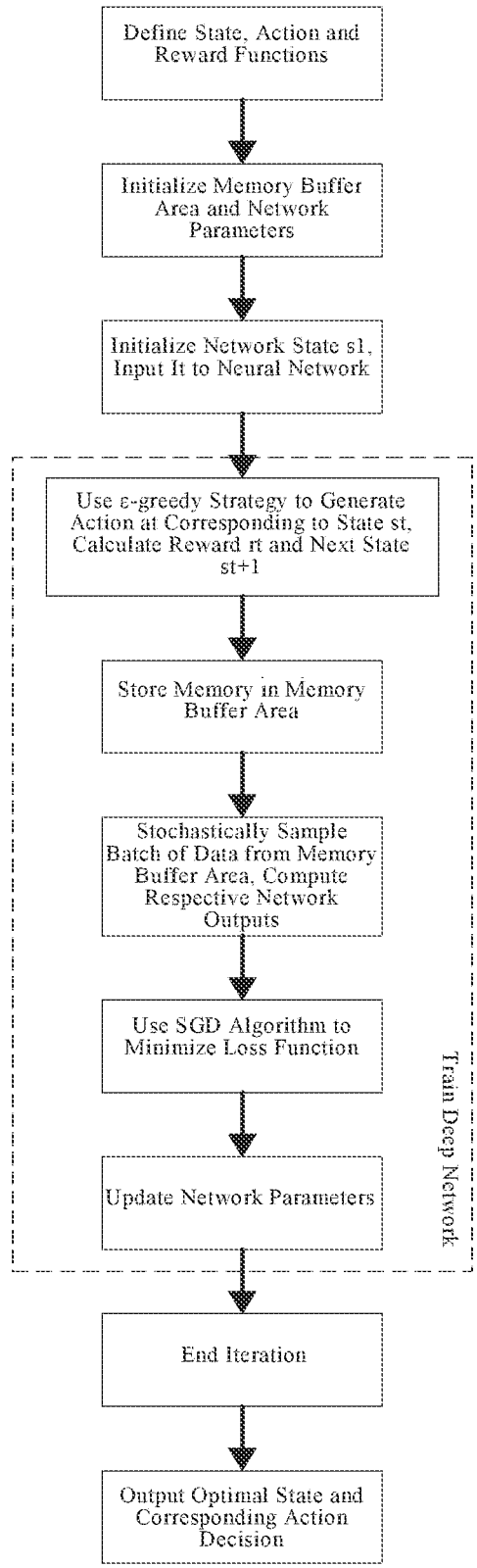
FIG. 3 is a flow diagram of deep reinforcement learning based offloading location decision of the present invention.

As shown in FIG. 3, in Step 4, the deep reinforcement learning includes the steps of:

Step 4.1: defining a state, an action and a reward;

Step 4.2: initializing a memory buffer area, the memory buffer area configured to store at least one set of memory data, the memory data including a current state, a current action, a current reward and a subsequent state, and initializing a weight of a value function network to make network parameters of the objective function the same as network parameters of the value function;

Step 4.3: initializing a state of the value function network, computing total time consumption T and total energy consumption E of all the computation tasks, taking a result of the computation as a state $s_1$, and inputting the state $s_1$ to the value function network to obtain corresponding outputs of the value function in response to different actions taken in the state $s_1$;

Step 4.4: performing action selection using a ε-greedy strategy by stochastically selecting an action $\alpha_t$ at a probability of ε or, otherwise, selecting an action that maximizes the value function, obtaining an immediate reward and proceeding to the next state $s_{t+1}$ as a result of executing the action, and storing each set of such memory data (including the state, action, immediate reward and next state) in the memory buffer area for network training;

Step 4.5: stochastically sampling a plurality of the memory data from the memory buffer area, in case of the current state being a final state, configuring a temporal difference target as $r_j$, in case of the current state not being a final state, inputting each of the plurality of the memory data to the objective function network to compute the temporal difference target, the objective function giving a network output as $$r + \gamma \max_{a'} Q(s', a'; \theta^-);$$

Step 4.6: taking the network outputs of the value function as estimated values, taking the network output of the objective function as a labeled value, using an SGD (Stochastic Gradient Descent) algorithm to update the network parameters of the value function, wherein an expression of the SGD algorithm is $$\Delta\theta = \nabla Q(s, a; \theta) \times \alpha \left[ r + \gamma \max_{a'} Q(s', a', \theta^-) - Q(s, a; \theta) \right],$$

the network parameters of the value function are configured to be updated according to the formula $\theta = \theta + \Delta\theta$;

Step 4.7: repeating Steps 4.4 to 4.6 until the network parameters of the value function are updated for a fixed number of times, valuing the objective function network with the network parameters of the value function in the current state, outputting an optimal state and an action associated with the optimal state. Moreover, this valuation approach weakens the relevance between successive data and increases stability of the network parameters.

Preferred specific embodiments have been described in detail above. It should be understood that, those of ordinary skill in the art, without the need for creative effort, can make various modifications and changes, based on the concept of the present invention. Accordingly, all the technical solutions that can be obtained by those skilled in the art by logical analysis, inference or limited experimentation in accordance with the concept of the invention on the basis of the prior art are intended to fall within the protection scope as defined by the claims.

The invention claimed is:

1. A method for task offloading based on power control and resource allocation in the Industrial Internet of Things, comprising steps of:

step 1: configuring an Industrial Internet of Things network, wherein the Industrial Internet of Things network comprises a plurality of switches and a plurality of devices, the plurality of switches communicating with one another in a wired fashion, partitioning the Industrial Internet of Things network into a plurality of cluster domains according to communication coverage ranges of the plurality of switches, wherein each of the plurality of cluster domains comprises one edge server and at least one device of the plurality of devices, the at least one device wirelessly communicating with a switch in the cluster domain where it is in, computing capacity of the edge server being $f_j^S$, computing capacity of each of the at least one device being $f_i^L$, each of the at least one device configured to generate one computation task $Q_i$, the computation task Q. configured to contain a task data volume indicator $d_i$ and a task computational load indicator $c_i$, executing the computation task on a device of the plurality of devices, and establishing a first computing model; wherein the first computing model comprises first time consumption $t_i^L$, first energy consumption $e_i^L$ and first overhead $u_i^L$;

offloading the computation task to a first edge server for computation thereon, and establishing a second computing model; wherein the first edge server comprising an edge server in a cluster domain where the device is in, the device offloading, via a first switch, the computation task to the first edge server for computation, the first switch comprising a switch in the cluster domain where the device is in, the first edge server configured to allocate, to the computation task offloaded to the first edge server, computing resources; wherein the second computing model comprises second time consumption $t_i^{LS}$, second energy consumption $e_i^{LS}$ and second overhead $u_i^{LS}$;

offloading the computation task to a second edge server for computation thereon, and establishing a third computing model; wherein the second edge server comprising an edge server in another cluster domain where the device is not in, the device offloading, via the first switch and a second switch, the computation task to the second edge server for computation, the second switch comprising a switch in a cluster domain where the second edge server is in, the second edge server configured to allocate, to the computation task offloaded to the second edge server, computing resources; wherein the third computing model comprises third time consumption $t_i^{OS}$, third energy consumption $e_i^{OS}$ and third overhead $u_i^{OS}$;

step 2: based on the first computing model, the second computing model and the third computing model, establishing a total overhead model for all computation tasks in the Industrial Internet of Things network, constructing an objective function and constructing a mixed integer non-linear programming problem; wherein the step 2 comprises:

defining a first decision variable $x_i = \{0,1\}$, wherein $x_i = 0$ means the computation task is executed at the device, while $x_i = 1$ means the computation task is offloaded to an edge server for computation;

defining a second decision variable $\beta_i=\{0,1\}$, wherein $\beta_i=0$ means the computation task is executred at the first edge server, while $\beta_i=1$ means the computation task is executed at the second edge server;

defining a third decision variable $\gamma_i$, wherein $\gamma_i$ represents the edge server that executes the computation task and $\gamma_i \in \{1,2\ldots,N\}$, overhead for the computation task $Q_i$ is $$u_i=(1-x_i)u_i^L+x_i(u_i^{LS}+\beta_i(u_i^{OS}-u_i^{LS}))$$

total overhead U for all the computation tasks in the Industrial Internet of Things network is $$U = \sum_{i=1}^M u_i = \sum_{i=1}^M [(1-x_i)u_i^L + x_i(u_i^{LS} + \beta_i(u_i^{OS} - u_i^{LS}))].$$

constructing the objective function as follows:

$$f(\kappa, p, x, \gamma, \beta) =$$

$$\sum_{i=1}^M u_i = \sum_{i=1}^M [(1-x_i)u_i^L + x_i(u_i^{LS} + \beta_i(u_i^{OS} - u_i^{LS}))] = \sum_{i=1}^M \left[(1-x_i)u_i^L + x_i\left(\alpha_i \cdot \left(\frac{d_i}{B_i \log_2\left(1+\frac{p_i g_i}{N_0 B_i}\right)} + \frac{c_i}{\kappa_i^{\gamma_i} f_{\gamma_i}^S}\right) + (1-\alpha_i) \cdot p_i \cdot \frac{d_i}{B_i \log_2\left(1+\frac{p_i g_i}{N_0 B_i}\right)} + \alpha_i \cdot \beta_i \cdot \frac{d_i}{r_w}\right)\right]$$

where, constraints are $\Sigma_{i\in o_y}\kappa_i^{\gamma_i} \leq 1$; $p_i \leq p_i^{max}$; $x_i \in \{0,1\}$, $i=1,2,\ldots,m$, $\beta_i \in \{0,1\}$, $i=1,2\ldots m$, $\gamma_i \in \{1,2,\ldots,n\}$, $O_{yi}$ represents a set of the computation tasks processed on the edge server $\gamma_i$, wherein optimization variables $\kappa_i^{\gamma_i}$, $P_i$ are continuous variables, $x_i$, $\beta_i$ and $\gamma_i$ are integer variables, thereby constructing the mixed integer non-linear programming problem;

Step 3: decomposing the non-linear programming problem in the step 2 into a communication power optimization problem and a computing resource allocation problem, obtaining optimal communication power at an extreme value point or a boundary of a domain of definition of the communication power optimization problem, using a method of Lagrange multipliers and a system of simultaneous equations of Karush-Kuhn-Tucker (KKT) conditions to derive an optimal computing resource allocation strategy for computing resource allocation, substituting the optimal communication power and the optimal computing resource allocation strategy into the objective function to obtain an offloading location decision problem model; wherein, the step of decomposing the non-linear programming problem into the communication power optimization problem and the computing resource allocation problem comprises:

substituting a given set feasible solutions into the objective function, assuming there are l devices choosing to offload the computation tasks to edge servers for processing, in which there are p devices to offload the computation tasks to the second edge server for processing and the remaining devices choose the first edge server, then in the objective function, there remain only the continuous variables $\kappa_i$ and $p_i$ thereby the objective function is expressed as:

$$f(\kappa, p) = \sum_{i=1}^l \left[\alpha_i \cdot \left(\frac{d_i}{B_i \log_2\left(1+\frac{p_i g_i}{N_0 B_i}\right)} + \frac{c_i}{\kappa_i^{\gamma_i} f_{\gamma_i}^S}\right) + (1-\alpha_i) \cdot p_i \cdot \frac{d_i}{B_i \log_2\left(1+\frac{p_i g_i}{N_0 B_i}\right)}\right] + \sum_{i=1}^p \alpha_i \cdot \frac{d_i}{r_w} + \sum_{i=M-i+2}^M \alpha_i \cdot \frac{c_i}{f_i^L}$$

wherein the communication power optimization problem is expressed as:

$$g(p) = \sum_{i=1}^l \left[\alpha_i \cdot \frac{d_i}{B_i \log_2\left(1+\frac{p_i g_i}{N_0 B_i}\right)} + (1-\alpha_i) \cdot p_i \cdot \frac{d_i}{B_i \log_2\left(1+\frac{p_i g_i}{N_0 B_i}\right)}\right]$$

with a corresponding constraint $p_i \leq p_i^{max}$;

wherein the computing resource allocation problem is expressed as:

$$\lambda(k) = \sum_{i=1}^l \alpha_i \cdot \frac{c_i}{\kappa_i^{\gamma_i} f_{\gamma_i}^S} + \sum_{i=1}^p \alpha_i \cdot \frac{d_i}{r_w} + \sum_{i=M-i+2}^M \alpha_i \cdot \frac{c_i}{f_i^L}$$

with a corresponding constraint $\Sigma_{i\in q_{yi}}\kappa_i^{\gamma_i} \leq 1$;

solving the communication power optimization problem to obtain an optimal comminication power $p_i$ solving the computing resource allocation problem to obtain an optimal computing resource allocation strategy $\kappa_i$ substituting the optimal communication power $p_i$ and the optimal computing resource allocation strategy $\kappa_i$ into the original objective function to obtain an offloading location decision problem expressed as:

$$f(x, \gamma, \beta) = \sum_{i=1}^M \left[(1-x_i)u_i^L + x_i\left(\alpha_i \cdot \left(\frac{d_i}{B_i \log_2\left(1+\frac{p_i^* g_i}{N_0 B_i}\right)} + \frac{c_i}{\kappa_i^* f_{\gamma_i}^S}\right) + (1-\alpha_i) \cdot p_i^* \cdot \frac{d_i}{B_i \log_2\left(1+\frac{p_i^* g_i}{N_0 B_i}\right)} + \alpha_i \cdot \beta_i \cdot \frac{d_i}{r_w}\right)\right].$$

step 4: based on the offloading location decision problem model obtained in the step 3, establishing a reinforcement learning model, using a deep reinforcement learning algorithm to train parameters of a depth neural network so as to maximize a cumulative reward of the reinforcement learning model from multi-step iteration, obtaining an optimal offloading location decision for the computation tasks, obtaining a joint optimization strategy comprising the optimal communication power, the optimal computing resource allocation strategy and the optimal offloading location decision, wherein the step 4 comprises;

stp 4.1: defining a state, an action and a reward; wherein the state is a state of system which comprises total time consumption T and total energy consumption E of all the tasks, the action comprises a first decision variable vector [$x_1, x_2, \ldots x_m$], a second decision variable vector [$\beta_1, \beta_2, \ldots \beta_m$] and a third decision variable vetor [$\kappa_1, \kappa_2, \ldots \kappa_m$];

wherein the first decision variable vector is configured to determine whether the computation tasks need to be offloaded, the second decision variable vector is configured to determine whether the computation tasks are computed on the edge servers in the cluster domains where the devices are in, the third decision variable vector is configured to determine the edge servers where the computation tasks are on, an action space of the action is $\alpha=[x_i, x_2, \ldots x_m, \beta_1, \beta_2, \ldots \beta_m, \gamma_1, \gamma_2, \ldots \gamma_m]$;

when the system in a state s takes an action α to transition to a next state s', an immediate reward is given as R(s,α), the reward of the system is defined as $$r = \frac{U_{local} - U}{U_{local}},$$

wherein $U_{local}$ is total overhead when all the computation tasks are computed at the first offloading locations, U is total overhead required to complete all the computation tasks under a current decision;

step 4.2: initializing a memory buffer area the memory buffer area configured to store at least one set of memory data, the memory data comprising a current state, a current action, a current reward and a subsequent state, and initializing a weight of a value function network to make network parameters of the objective function the same as network parameters of the value funciton;

step 4.3: initializing a state of the value function network, computing total time consumption T and total energy consumption E of all the computation tasks, taking a result of the computation as a state $S_1$ and inputting the state $S_1$ to the value function network to obtain corresponding outputs of the value function in response to different actions taken in the state $S_1$;

step 4.4: selecting a current action using a ∈-greedy strategy, after executing the current action, obtaining an immediate reward and proceeding to a next state $S_{t+1}$, storing each set of the memory data in the memory buffer area;

step 4.5: stochastically sampling a plurality of the memory data from the memory buffer area in case of the current state being a final state, configuring a temporal difference target as $r_i$ in case of the current state not being a final state, inputting each of the plurality of the memory data to the objective function network to compute the temporal difference target, the objective function giving a network output as $$r + \gamma \max_{a'} Q(s', a'; \theta^-);$$

step 4.6: taking the network outputs of the value function as estimated values, taking the network outputs of the objective function as a labeled value, using an SGD (Stochastic Gradient Descent) algorithm to update the network parameters of the value function, wherein an expression of the SGD algorithm is $$\nabla\theta = \nabla Q(s, \alpha; \theta) X \alpha[r = \gamma \max Q(s', \alpha'; \theta^-) - Q(s, \alpha; \theta)]$$

the network parameters of the value function are configured to be updated according to the forumula $\theta = \theta + \nabla\theta$;

step 4.7: repeating steps 4.4 to 4.6 until the network parameters of the value function are updated for a fixed number of times, valuing the objective function network with the network parameters of the value function in the current state, outputting an optimal state and an acton associated with the optimal state.

2. The method for task offloading based on power control and resource allocation in the Industrial Internet of Things as in claim 1, wherein the first time consumption is $$t_i^L = \frac{c_i}{f_i^L}.$$

3. The method for task offloading based on power control and resource allocation in the Industrial Internet of Things as in claim 2, wherein the first energy consumption is $e_i^L = \zeta_i (f_i^L) c_i$, where $\zeta_i$ is an energy consumption density of a device i for execution of the computation task.

4. The method for task offloading based on power control and resource allocation in the Industrial Internet of Things as in claim 3, wherein the first overhead is $u_i^L = \alpha_i \cdot t_i^L = (1-\alpha_i) \cdot e_i^L$, where $\alpha_i$ is a weight factor and $\alpha_i \in (0,1)$.

5. The method for task offloading based on power control and resource allocation in the Industrial Internet of Things as in claim 4, wherein the second time consumption is $$t_i^{LS} = \frac{d_i}{r_i} + \frac{c_i}{\kappa_i^{\gamma_i} f_{\gamma_i}^S} = \frac{d_i}{B_i \log_2\left(1 + \frac{p_i g_i}{N_0 B_i}\right)} + \frac{c_i}{\kappa_i^{\gamma_i} f_{\gamma_i}^S}$$

where $y_i$ represents the second edge server that executes the computation task $Q_i$ and $Y_i \in \{1,2,\ldots N\}$, $k_i^{Y_i}$ represents a proportion of computing capacity allocated by the first edge server $Y_i$ to the computation task $Q_i$, a total wireless communication bandwidth of the first switch $S_i$ is $B_i$, an ensemble of devices in the cluster domain where the device is in is $\Psi_i$, the size of an actual bandwidth allocated to the device i is $$B_i = \frac{d_i}{\sum_{k \in \Psi_j} x_k \cdot d_k} \cdot B_j,$$

where $x_i$ is a binary variable, and $x_i=0$ means the computation task is executed at the device, while $x_i=1$ means the computation task is executed at the edge server, the device i wirelessly communicates with the first switch using time division multiple access (TDMA) at a data transmission rate that is $$r_i = B_i \log_2\left(1 + \frac{p_i g_i}{N_0 B_i}\right)$$

where $p_i$ is communication transmission power of the device i, $g_i$ is a channel gain between the device i and the switch, $N_o$ is a single-sided power spectral density of channel noise.

6. The method for task offloading based on power control and resource allocation in the Industrial Internet of Things as in claim 5, wherein the second energy consumption is $$e_i^{LS} = p_i \cdot \frac{d_i}{r_i} = p_i \cdot \frac{d_i}{B_i \log_2\left(1 + \frac{p_i g_i}{N_0 B_i}\right)}.$$

7. The method for task offloading based on power control and resource allocation in the Industrial Internet of Things as in claim 6, wherein the second overhead is $u_i^{LS} = \alpha_i \cdot t_i^{LS} = (1-\alpha_i) \cdot e_i^{LS}$, where $\alpha_i$ is a weight factor and $\alpha_i \in (0,1)$.

8. The method for task offloading based on power control and resource allocation in the Industrial Internet of Things as in claim 7, wherein a data transmission rate between the first switch and the second switch is a constant $r_w$; the third time consumption is $$t_i^{OS} = \frac{d_i}{r_i} + \frac{d_i}{r_w} + \frac{c_i}{\kappa_i^{\gamma_i} f_{\gamma_i}^S} = \frac{d_i}{B_i \log_2\left(1 + \frac{p_i g_i}{N_0 B_i}\right)} + \frac{d_i}{r_w} + \frac{c_i}{\kappa_i^{\gamma_i} f_{\gamma_i}^S}$$

where $d_i|r_i$ is a transmission time for the device to offload the computation task to the first switch, $d_i|r_w$ is a transmission time for the first switch to offload the computation task to the second switch, $$\frac{c_i}{\kappa_i^{\gamma_i} f_{\gamma_i}^S}$$

is a computation time of the computation task on the second edge server,

Y$_i$ represents the second edge server that executes the computation task Q$_i$ and Y$_i \in \{1,2,\ldots N\}$, K$_i^{y_i}$ represents a proportion of computing capacity allocated by the second edge server Y$_i$ to the computation task Q$_i$;

a total wireless communication bandwidth of the first switch S$_i$ is B$_i$, an ensemble of devices in the cluster domain where the device is in is $\Psi_j$, a size of an actual bandwidth allocated to the device i is $$B_i = \frac{d_i}{\sum_{k \in \Psi_j} x_k \cdot d_k} \cdot B_j,$$

where $x_i$ is a binary variable and $x_i=0$ means the computation task is executed at the device, while $x_i=1$ means the computation task is executed at the second edge server;

the device i wirelessly communicates with the first switch using time division multiple access (TDMA) at a data transmission rate that is $$r_i = B_i \log_2\left(1 + \frac{p_i g_i}{N_0 B_i}\right)$$

where P$_i$ is communication transmission power of the device i, g$_i$ is a channel gain between the device i and the switch, N$_o$ is a single-sided power spectral density of channel noise.

9. The method for task offloading based on power control and resource allocation in the Industrial Internet of Things as in claim 8, wherein the third energy consumption is $$e_i^{OS} = p_i \cdot \frac{d_i}{r_i} = p_i \cdot \frac{d_i}{B_i \log_2\left(1 + \frac{p_i g_i}{N_0 B_i}\right)}.$$

10. The method for task offloading based on power control and resource allocation in the Industrial Internet of Things as in claim 9, wherein the third overhead is $u_i^{OS} = \alpha_i \cdot t_i^{OS} + (1-\alpha_i) \cdot e_i^{OS}$.

* * * * *